April 6, 1948.    J. B. BIDWELL ET AL    2,439,035
BEARING TESTING MACHINE
Filed March 8, 1945    2 Sheets-Sheet 1

Inventors
Joseph B. Bidwell &
Arthur F. Underwood
By Blackmore, Smeeth & Ulet
Attorneys

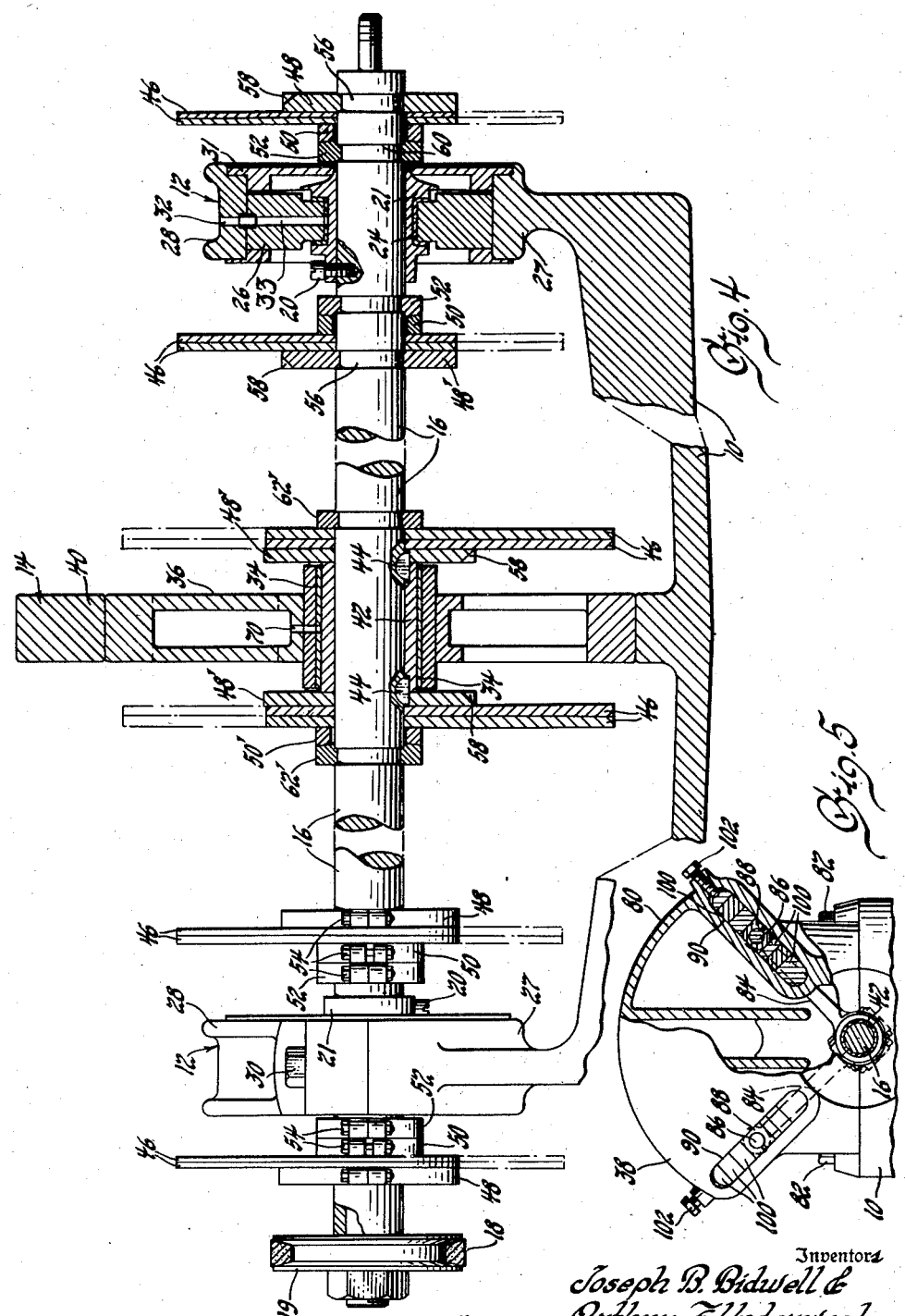

Patented Apr. 6, 1948

2,439,035

UNITED STATES PATENT OFFICE 2,439,035

BEARING TESTING MACHINE

Joseph B. Bidwell, Philadelphia, Pa., and Arthur F. Underwood, Grosse Pointe, Mich., assignors to General Motors Corporation, Detroit, Mich., a corporation of Delaware Application March 8, 1945, Serial No. 581,652

7 Claims. (Cl. 73—7)

1

This is an invention in machines for testing bearings.

The object is to provide a machine which will make it possible to test bearings, such as the main and connecting rod bearings of engines, under conditions closely simulating those encountered in the operation of the engine. In addition to the usual provision for variation of the speed of the shaft running in the bearing, provision is made for convenient variation of the load on the bearing, and for flexing the shaft so that the portion of it engaging the test bearing has any desired slope within the limits likely to be reached in actual operation of the engine.

In the preferred embodiment the machine consists of a long flexible shaft mounted in end bearings and driven by any suitable means such as a variable speed electric motor. The center of the shaft runs in the test bearing which is held in a suitable fixture, preferably consisting of the portion of the crankcase or the connecting rod or rods in which it is mounted in the engine.

Adjustably secured to the shaft on either side of each of the bearings is a pair of eccentric weights which may be adjusted on the shaft to apply to it any desired loading within the limits of the weights. By properly adjusting the weights on either side of the test bearing the shaft may be flexed to the extent desired. Since flexing of the shaft decreases the load capacity and life of the end bearings, the weights adjacent these bearings are adjusted to eliminate bending of the sections of the shaft passing through them.

An advantage of employing a long flexible shaft is that it makes it easier to confine the flexing to the portion of the shaft operating in the test bearing.

In the drawings:

Figure 4 is a partial vertical longitudinal section through the machine showing a test bearing in place.

Figure 5 is a partial sectional view showing a modification used in testing connecting rods.

Figure 1:
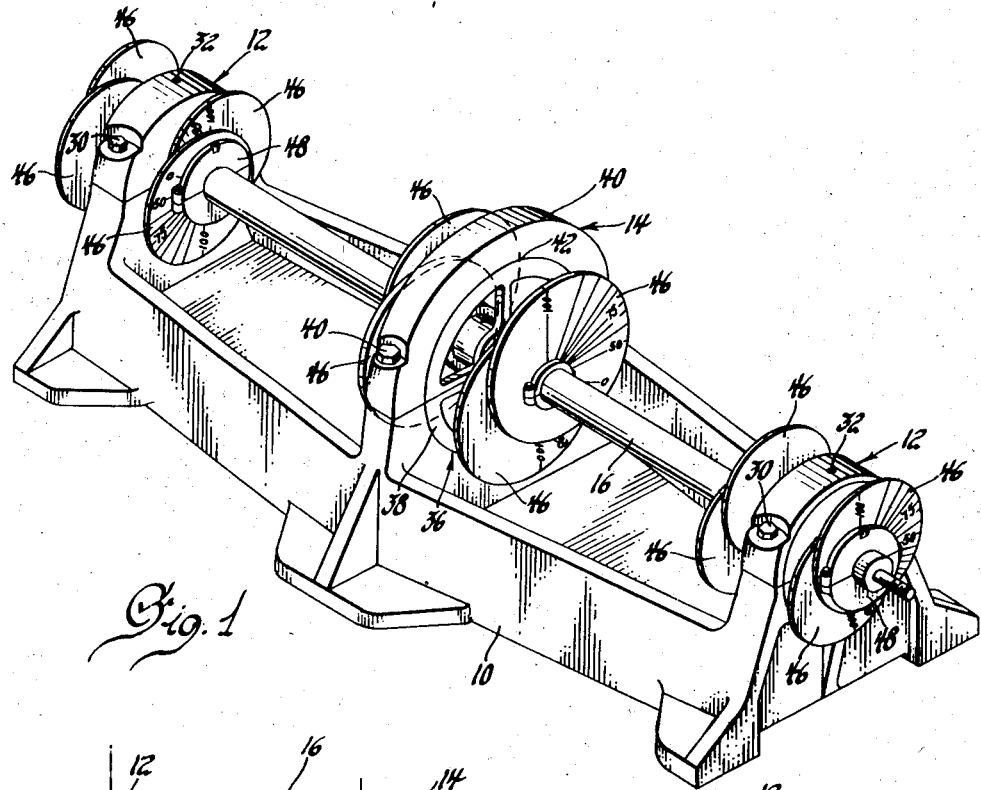
Figure 1 is a perspective view of the improved machine.

10 indicates the base of the machine provided with end bearing assemblies 12 and a center bearing assembly 14 in which is supported a flexible

2 shaft 16. Shaft 16 is driven from any suitable variable speed source of power such as an electric motor, not shown, by means of a belt 18 and pulley 19.

One of the end bearing assemblies 12 is shown in detail at the right-hand end of Figure 4 and as both end bearings are identical, description of one will suffice. Secured to the end of the shaft by stud 20 is a collar 21 providing the journal running in the flanged bearing 24 mounted in split annular bearing support 26 fitted in a semi-annular seat 27 formed in the base 10 and held in position by cap 28 secured to the base by bolts 30 as shown. Member 26 may be held against endwise movement by plates 31 secured to the seat 27 and cap 28 by suitable bolts not shown. A passage 32 in cap 28 cooperates with a radial passage 33 in member 26 and permits supplying of oil to the bearing surfaces.

The center bearing assembly 14 is of somewhat similar construction. In the arrangement shown in Figure 4 the half bearings 34 undergoing tests are secured in a split annular support 38 which may be in the form of a ribbed or spoked wheel, as shown, fitted in a semicircular seat 36 formed in the base 10 and held in place by bolted-on securing cap 40 as shown.

Half bearings 34 provide a bearing for sleeve 42 which is pressed on the shaft 16 and keyed to it by keys 44 as shown.

Adjacent each end of each of the end bearings is a pair of weights in the form of eccentric discs 46. Each pair of discs is secured to the shaft in the following manner. The discs are clamped to the shaft in pairs by means of an assembly of split rings 48, 50 and 52, each ring consisting of two semi-annular halves secured together by bolts 54 as best shown at the left of Figure 4. Split ring 48 fits in annular groove 56 formed in shaft 16 and is provided with a notch 58 having an index mark therein.

Split ring 52 is received in annular groove 60 in the shaft 16. The side of split ring 52 nearer the discs 46 is wedged-shaped as shown.

Split ring 50 is provided with wedge-shaped surfaces cooperating with the wedge-shaped surfaces on split ring 52. The interior of split ring 50 is larger than the diameter of shaft 16 so that by tightening the bolts securing the parts of the split ring 50 together the discs 46 may be securely clamped between split rings 50 and 48.

A somewhat similar arrangement is provided for securing the somewhat larger and heavier eccentric discs 46 on either side of the center bearing 34. Here 62′ indicates a split ring clamped in an annular groove in the shaft 16 at the right of the center bearing. Next to the split ring 62 are the discs 46 followed by ring 48' which, like the discs, may be a slip fit on the shaft 16. Ring 48' is preferably keyed to the shaft by the adjacent key 44 which keys the sleeve 42 to the shaft.

In similar manner a ring 48' and eccentric discs 46 are mounted at the other end of sleeve 42 but in this case the split ring 62' is provided with a wedge-shaped surface which cooperates with the wedge-shaped surface of split ring 50' the interior diameter of which is greater than that of the shaft. By drawing together the two halves of split ring 50' the two pairs of discs 46 are clamped to the shaft. A passage 70 supplies lubricant to the surface of the test bearing.

Figure 3:
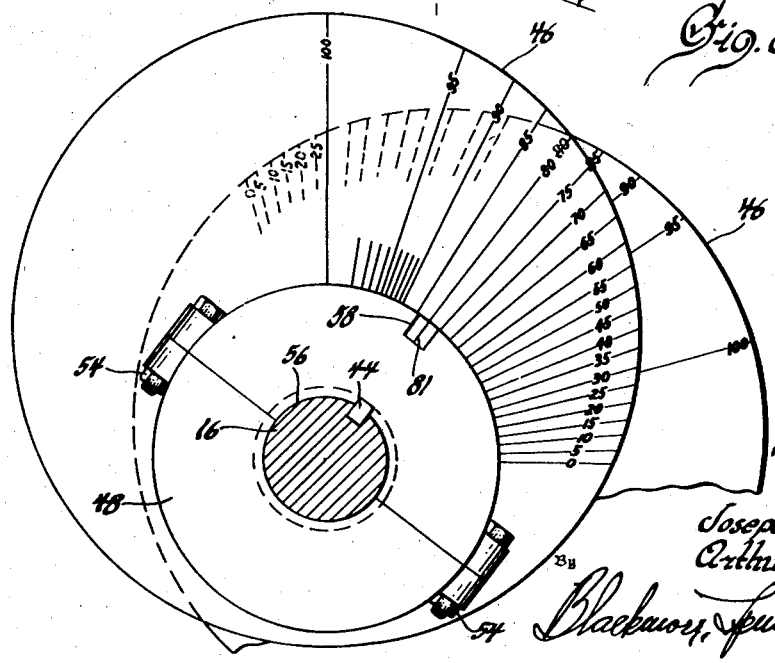
Figure 3 is a section through the shaft adjacent a pair of weights.

As best shown in Figure 3, each of the eccentric discs 46 is calibrated, the calibration on one disc being in reverse order with respect to that on the other. By loosening the wedge-shaped rings 50 or 50' the discs may be adjusted to any position desired. The index mark 81 provided at the bottom of notch 58 of discs 48 or 48' serves as the reference point in adjusting the discs. Thus, in the arrangement shown in Figure 3 the discs are arranged with both calibration marks 80 in line with index mark 81 and the resultant unbalance is effective along the radius indicated by the mark.

The maximum out of balance is obtained when the two discs are aligned and this is accomplished when the calibration marks 100 coincide with the index mark 81. Zero unbalance is obtained when the zero calibration marks are aligned with the index mark 81. In this position the two discs balance each other so there is no out of balance.

In the use of the machine the eccentric discs on either side of the test bearing may be adjusted to give a bend to the shaft which simulates that of the shaft to which the test bearing is to be applied in service. If nothing more were done, the ends of the shaft 16 would also be considerably flexed with the result that the end bearings would have a short life. Consequently, eccentric discs 46 are provided on each side of the end bearings and these are adjusted so as to put the shaft in dynamic balance and at the same time take as much deflection as possible out of the ends of the shaft.

Figure 2:
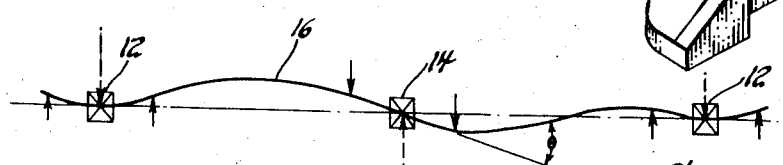
Figure 2 is a diagrammatic view showing in an exaggerated manner an example of flexing of the shaft that may be produced by the weights.

Figure 2 indicates diagrammatically and in an exaggerated fashion the results that may be accomplished. By proper arrangement of the eccentric discs the shaft 16 is caused to flex so that it assumes the inclined position shown where it passes through the center bearing 14 and at the same time remains substantially straight or unflexed where it passes through the end bearings 12. The arrows indicate the forces applied by the discs and the reaction forces at the bearings.

In Figure 5 there is shown a modification in which there is substituted for the test bearing support shown in Figure 1, a bearing support 80 bolted to the base 10 by bolts 82 and designed to receive a pair of connecting rods 84, the big ends of which surround the sleeve 42 on shaft 16. The upper ends of the connecting rods are provided with the usual piston pins 86 on the ends of which are fitted blocks 88 secured in guides 90 by blocks 100 and clamping screws 102. Shims may be used along with the blocks 100 to get the desired adjustment. The described arrangement simply replaces the test bearing holder shown in Figure 4 and the machine is otherwise as previously described.

We claim:

1. In a bearing test machine the combination of a support, a shaft rotatably mounted on the support, a bearing holder on the support adapted to receive a test bearing in which the shaft is journaled, and a pair of weights eccentrically and independently pivoted on the shaft at each end of said test bearing for circumferential adjustment about the shaft axis, and means for locking the weights to the shaft in any desired position of adjustment so as to give any desired camber to the adjacent portions of the shaft including the portion journaled in said test bearing.

2. In a bearing test machine the combination of a support, end bearings mounted on the support, a shaft rotatably mounted in the end bearings, a bearing holder mounted on the support between the end bearings adapted to receive a test bearing in which the shaft is journaled, a pair of weights eccentrically and independently pivoted on the shaft adjacent said test bearing for circumferential adjustment about the shaft axis, pairs of weights eccentrically and independently pivoted on the shaft on either side of each of said end bearings for circumferential adjustment about the shaft axis, and means for locking each of said pairs of weights to the shaft in any desired position of adjustment to give the desired camber to adjacent portions of the shaft.

3. In the combination as defined in claim 2, said locking means comprising a collar secured on the shaft adjacent one of said discs and having an index mark thereon, and each of said weights having radial calibration marks thereon, the marks of each pair of weights being reversely arranged, said marks cooperating with the index mark on said collar.

4. In the combination as defined in claim 2, the weights adjacent the end bearings having less mass than those adjacent the test bearing.

5. In a bearing machine as defined in claim 2, said shaft being long and flexible and said test bearing and the adjacent weights being spaced a substantial distance from the end bearings and their weights so as to permit adjustment of the weights to cause the portion of the shaft passing through the test bearing to bend while the portions of the shaft passing through the end bearings are substantially free from deflection.

6. In a bearing test machine, the combination of a support provided with bearing means, a long uniformly flexible shaft rotatably mounted in said bearing means, a bearing holder on the support adapted to receive a test bearing in which the shaft is journaled, a pair of weights of equal mass on said shaft adjacent said bearing holder and on the side thereof opposite said bearing means, said weights having their centers of mass eccentric to the shaft axis and independently pivoted on the shaft for circumferential adjustment about the shaft axis and means for locking the weights to the shaft in any desired position of adjustment so as to give any desired camber to adjacent portions of the shaft including the portion journaled in said test bearing.

7. In a bearing test machine, the combination of a support, end bearings mounted on the support, a long uniformly flexible shaft rotatably mounted in the end bearings, a bearing holder mounted on the support between the end bearings adapted to receive a test bearing in which the shaft is journaled, pairs of weights eccentrically and independently pivoted on the shaft on either side of said test bearing for circumferential adjustment about the shaft axis, pairs of weights eccentrically and independently pivoted on the shaft on either side of each of said end bearings for circumferential adjustment about the shaft axis and means for locking each of said pairs of weights to the shaft in any desired position of adjustment to give the desired camber to adjacent portions of the shaft.

JOSEPH B. BIDWELL.
ARTHUR F. UNDERWOOD.

REFERENCES CITED

The following references are of record in the file of this patent:

UNITED STATES PATENTS

| Number | Name | Date |
| --- | --- | --- |
| 1,608,174 | Heymann | Nov. 23, 1926 |
| 1,980,693 | Newman et al. | Nov. 13, 1934 |
| 2,033,588 | Pigott et al. | Mar. 10, 1936 |